US010776524B2

(12) United States Patent
Yao et al.

(10) Patent No.: US 10,776,524 B2
(45) Date of Patent: Sep. 15, 2020

(54) SECURE COMMUNICATION CHANNEL FOR SYSTEM MANAGEMENT MODE

(71) Applicant: Intel Corporation, Santa Clara, CA (US)

(72) Inventors: Jiewen Jacques Yao, Shanghai (CN); Vincent J. Zimmer, Tacoma, WA (US); Bassam N. Coury, Dupont, WA (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/773,262

(22) PCT Filed: Jan. 14, 2016

(86) PCT No.: PCT/CN2016/070868
§ 371 (c)(1),
(2) Date: May 3, 2018

(87) PCT Pub. No.: WO2017/120812
PCT Pub. Date: Jul. 20, 2017

(65) Prior Publication Data
US 2018/0322313 A1 Nov. 8, 2018

(51) Int. Cl.
*H04L 29/06* (2006.01)
*G06F 21/74* (2013.01)
(Continued)

(52) U.S. Cl.
CPC .......... *G06F 21/74* (2013.01); *G06F 9/45558* (2013.01); *G06F 21/44* (2013.01); *H04L 9/3263* (2013.01); *G06F 2009/45591* (2013.01)

(58) Field of Classification Search
CPC ...................................................... G06F 21/74
See application file for complete search history.

(56) References Cited

U.S. PATENT DOCUMENTS 6,507,904 B1 * 1/2003 Ellison .................... G06F 21/53
711/152
9,848,302 B2 * 12/2017 Yang ..................... H04W 4/025
(Continued)

FOREIGN PATENT DOCUMENTS

| CN | 101950262 A | 1/2011 |
| CN | 103729219 A | 4/2014 |
| WO | WO-2017120812 A1 | 7/2017 |

OTHER PUBLICATIONS

"International Application Serial No. PCT/CN2016/070868, International Search Report dated Feb. 29, 2016", 4 pgs.
(Continued)

*Primary Examiner* — Shawnchoy Rahman
(74) *Attorney, Agent, or Firm* — Schwegman Lundberg & Woessner, P.A.

(57) ABSTRACT

Embodiments are directed to securing system management mode (SMM) in a computer system. A CPU is configurable to execute first code in a normal mode, and second code in a SMM. A SMM control engine is operative to transition the CPU from the normal mode to the SMM in response to a SMM transition call, and to control access by the CPU in the SMM to data from an originator of the SMM transition call. The access is controlled based on an authorization state assigned to the SMM transition call. An authorization engine is operative to perform authentication of the originator of the SMM transition call and to assign the authorization state based on an authentication result. The CPU in the SMM is prevented from accessing the data in response to the authentication result being a failure of authentication.

24 Claims, 6 Drawing Sheets

(51) Int. Cl.
   *G06F 9/455*   (2018.01)
   *G06F 21/44*   (2013.01)
   *H04L 9/32*    (2006.01)

(56)            References Cited

U.S. PATENT DOCUMENTS

| | | | |
|---|---|---|---|
| 9,900,310 B2* | 2/2018 | Brickell | H04L 63/0876 |
| 10,198,861 B2* | 2/2019 | Anderson | G06T 19/003 |
| 10,248,486 B2* | 4/2019 | Branco | G06F 9/4418 |
| 10,341,116 B2* | 7/2019 | Liu | H04L 9/0643 |
| 10,469,181 B2* | 11/2019 | Pan | H04B 17/15 |
| 10,510,154 B2* | 12/2019 | Chattopadhyay | G06T 7/11 |
| 2003/0132829 A1* | 7/2003 | Frolov | E05B 47/00 |
| | | | 340/5.7 |
| 2003/0226014 A1* | 12/2003 | Schmidt | G06F 21/57 |
| | | | 713/164 |
| 2006/0242406 A1* | 10/2006 | Barde | G06F 21/10 |
| | | | 713/164 |
| 2009/0204823 A1* | 8/2009 | Giordano | G06F 11/3648 |
| | | | 713/190 |
| 2017/0093578 A1* | 3/2017 | Zimmer | G06F 9/45558 |
| 2019/0243961 A1* | 8/2019 | Ollivier | G06F 21/57 |

OTHER PUBLICATIONS

"International Application Serial No. PCT/CN2016/070868, Written Opinion dated Feb. 29, 2016", 4 pgs.

* cited by examiner

SECURE COMMUNICATION CHANNEL FOR SYSTEM MANAGEMENT MODE

This application is a U.S. National Stage Filing under 35 U.S.C. 371 from International Application No. PCT/CN2016/070868, filed on Jan. 14, 2016, and published as WO 2017/120812 on Jul. 20, 2017, which application is incorporated herein by reference in its entirety.

TECHNICAL FIELD

Embodiments described herein generally relate to information processing and security, more particularly, to assuring the authenticity of code to be executed in the system management mode (SMM) of a computer system.

BACKGROUND

In personal computer (PC) systems, system management mode (SMM) is an operating mode of x86-family central processor units (CPUs) in which all normal execution, including the operating system, is suspended and special system software is executed with high privileges. SMM is generally used handling system-wide functions like power management, system hardware control, operating system (OS) validation, cryptography, or proprietary original equipment manufacturer (OEM)-designed code. SMM is generally used only by system firmware, not by applications or general-purpose systems software. A benefit of SMM is that it offers a distinct and isolated computing environment that operates independently of the operating system, hypervisor, or application software.

However, in recent years SMM has increasingly become an attack vector for malware, such as rootkits. Even though the executable code in the SMM may be firmware-based and error-free, a variety of techniques for tampering with the operation of the SMM have been seen. For instance, data objects (such as variables, parameter values, function calls, etc.) may be passed to the SMM by the OS, and these data objects may be exploited to gain access to the SMM's high privilege level. For instance, commands may be sent to the SMM that may cause the SMM to perform a series of actions to compromise security features of the OS. In another example, techniques as buffer overflow attack may be used to inject unexpected code into the SMM. These vulnerabilities are further compounded by the fact that SMM operates outside the reach of any anti-malware programs installed and operational under the control of the operating system. Solutions are needed to reduce the susceptibility of the SMM to attack.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to securing system management mode (SMM) in a computer system. The computer system may be one physical machine, or may be distributed among multiple physical machines, such as by role or function, or by process thread in the case of a cloud computing distributed model. In various embodiments certain operations may run in virtual machines that in turn are executed on one or more physical machines. It will be understood by persons of skill in the art that features of the invention may be realized by a variety of different suitable machine implementations.

Figure 1:
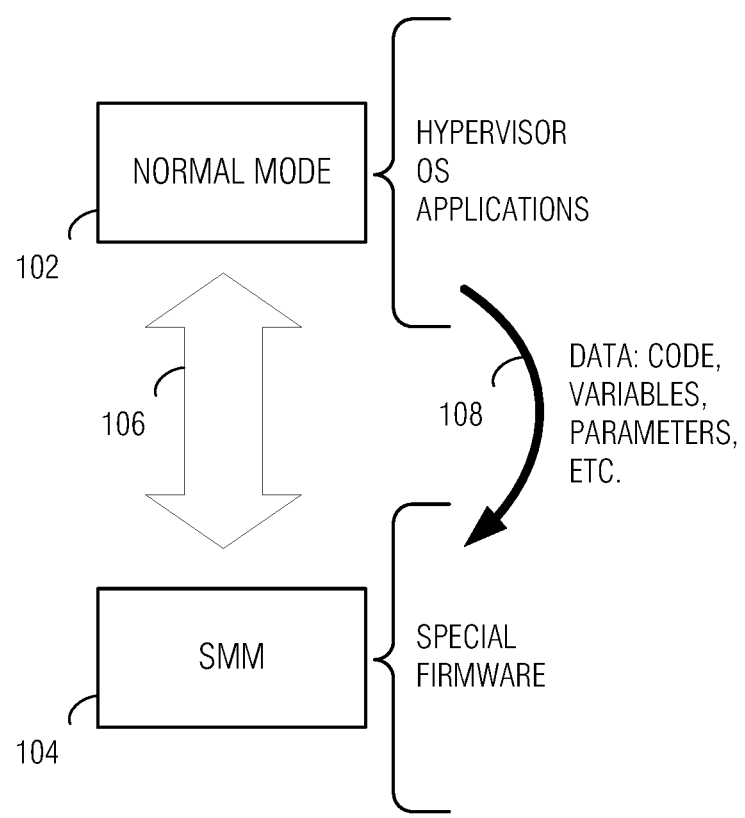
FIG. 1 is a high-level block diagram illustrating a basic relationship between operating modes of a central processing unit (CPU) according to embodiments described herein.

FIG. 1 is a high-level block diagram illustrating a basic relationship between operating modes of a central processing unit (CPU) according to embodiments described herein. As depicted, there are two operating modes that are the subject of the present disclosure: Normal mode 102, and SMM 104. There may be additional operating modes for the CPU, and a practical computer system may support many additional operations; but for the sake of clarity the two modes of interest are detailed. In normal mode 102 the CPU executes the code of a hypervisor (e.g., virtual machine monitor) when the computer system is configured to run virtual machines. In addition, in normal mode 102 the computer system executes one or more operating systems, including a variety of device and system drivers, and application programs. SMM 104 is reserved for the execution of specialized firmware, typically for the purpose of configuring the computer system, checking the integrity of software to be executed in normal mode 102, and various other purposes; however, as discussed above, SMM 104 may be compromised, which presents a dangerous scenario given the high degree of privilege that SMM 104 is granted in the computer system.

As represented at 106, the CPU may transition from one mode to another. The transition may be effected in various ways, but most notably for the present discussion, the transition from normal mode 102 to SMM 104 may be called by a program, such as a system driver, or some other portion of an operating system, for instance, running in normal mode 102. In general, the call to transition from normal mode 102 to SMM 104 may be accompanied by a passing of some data, e.g., code, variables, parameters, and the like, that may affect or even direct the functionality of SMM 104.

Figure 2:
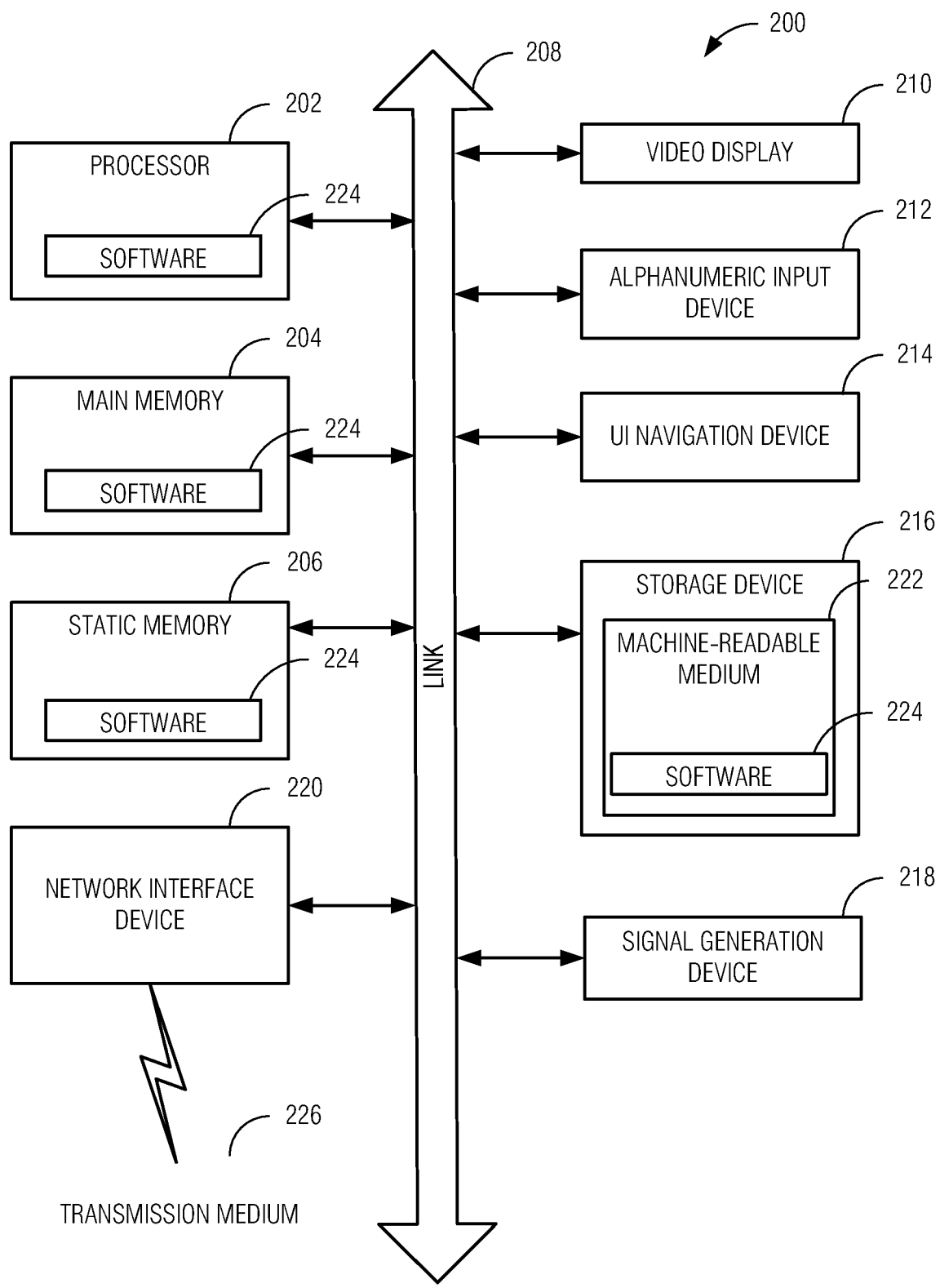
FIG. 2 is a block diagram illustrating a computer system in the example form of a general-purpose machine.

FIG. 2 is a block diagram illustrating a computer system in the example form of a general-purpose machine. In certain embodiments, programming of the computer system 200 according to one or more particular algorithms produces a special-purpose machine upon execution of that programming In a networked deployment, the computer system 200 may operate in the capacity of either a server or a client machine in server-client network environments, or it may act as a peer machine in peer-to-peer (or distributed) network environments. The computer system 200 may take any suitable form factor, such as a personal computer (PC) workstation, a server, whether rack-mounted, or stand-alone, a mainframe computer, a cluster computing system, or the like, a set-top box, as well as a mobile or portable computing system, such as a laptop/notebook PC, an onboard vehicle system, wearable device, a tablet PC, a hybrid tablet, a personal digital assistant (PDA), a mobile telephone or, more generally, any machine capable of executing instructions (sequential or otherwise) that specify actions to be taken by that machine.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In an embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
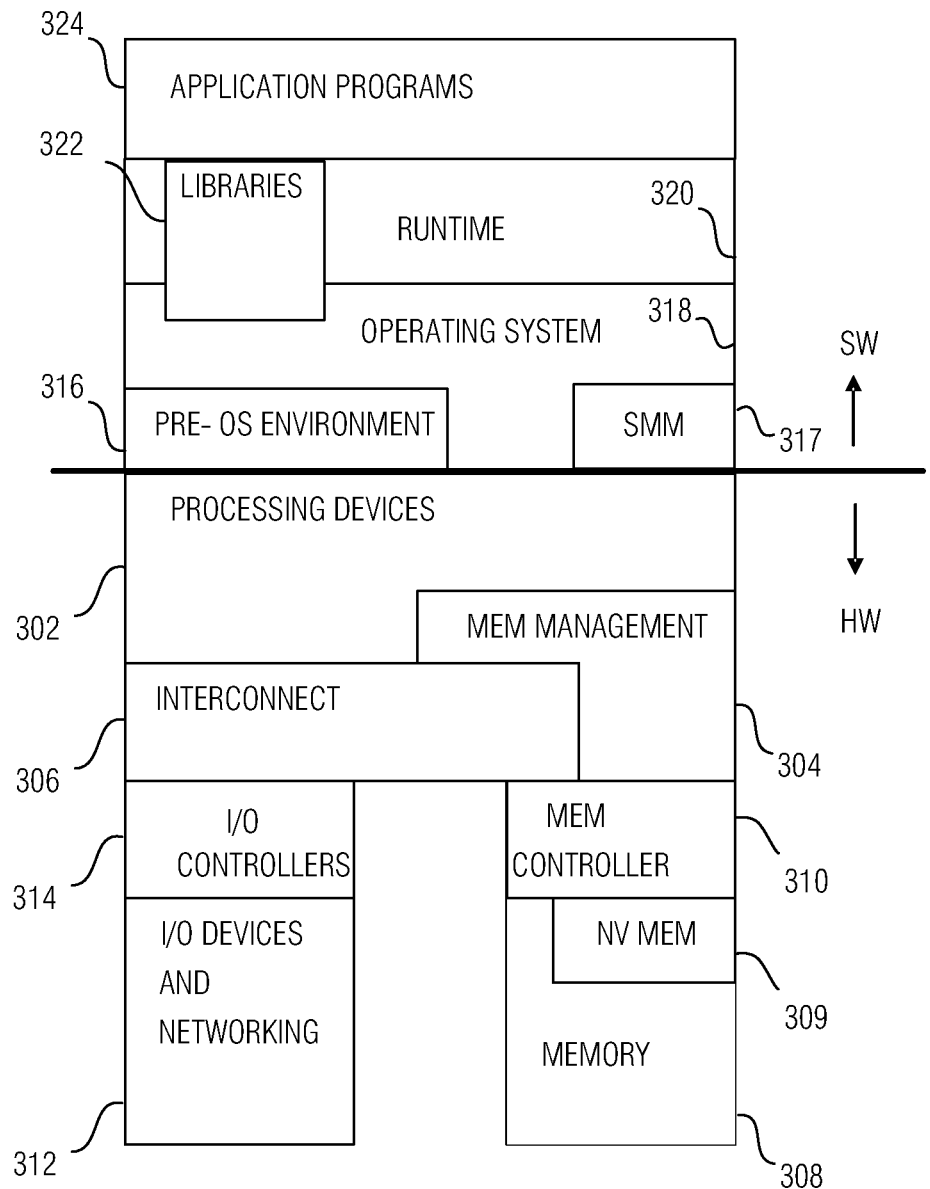
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

System management mode (SMM) represents code executed in a special-purpose operating mode of processing devices 302 that is provided for handling system-wide functions like power management, system hardware control, or proprietary OEM designed code. In general, SMM is intended for use by system firmware, not by applications software or general-purpose systems software, though SMM may be called by a system management interrupt (SMI) initiated by the software stack. SMM provides a distinct and isolated processor environment that operates transparently to the operating system or executive and software applications. Processing devices 302 execute the SMM code in a separate address space that is inaccessible to other operating modes of the processing devices 302.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
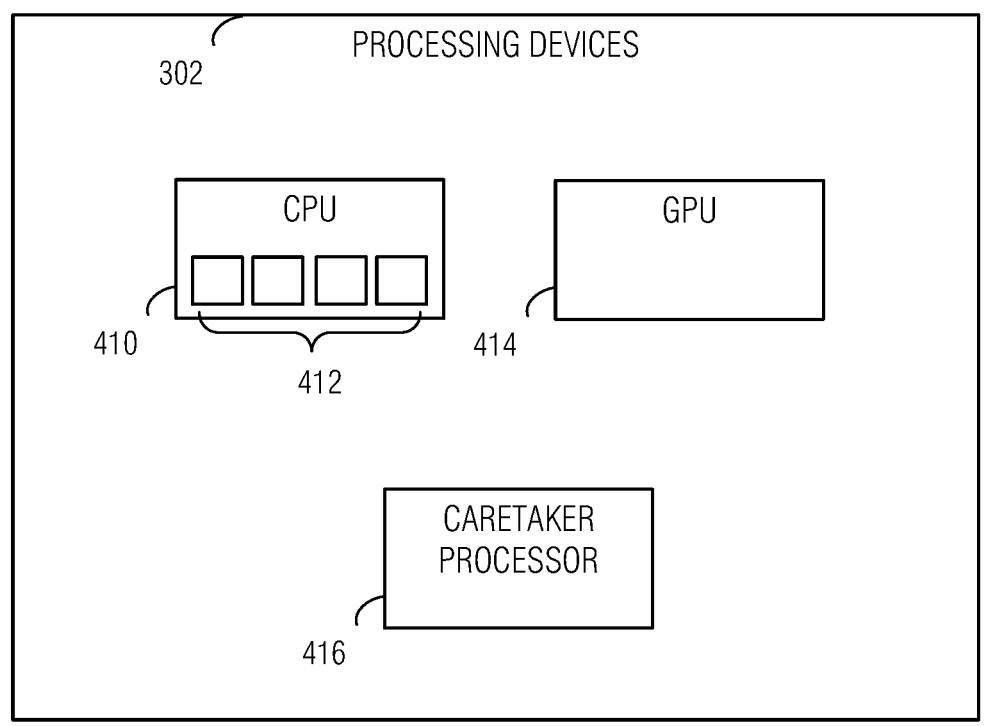
FIG. 4 is a block diagram illustrating processing devices according to some embodiments.

FIG. 4 is a block diagram illustrating processing devices 302 according to some embodiments. CPU 410 may contain one or more processing cores 412. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 also include caretaker processor 416. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP).

Figure 5:
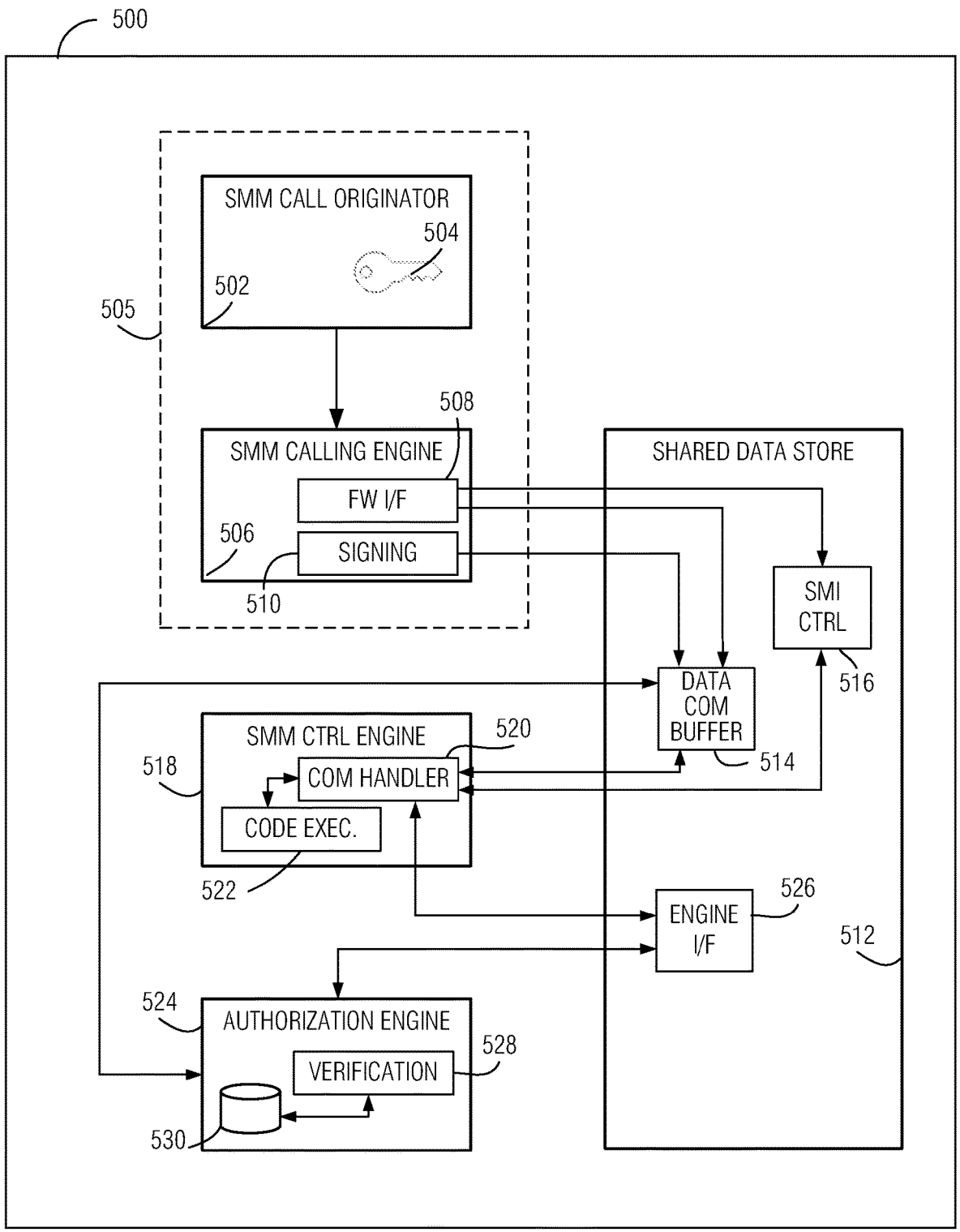
FIG. 5 is a block diagram illustrating example components that may be implemented on a computer system, such as the computer system described with reference to FIGS. 2-4, according to some embodiments.

FIG. 5 is a block diagram illustrating example components that may be implemented on a computer system, such as the computer system and components described with reference to FIGS. 2-4, according to various embodiments. Examples, as described herein, may include, or may operate on, logic or a number of components, modules, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. With reference to FIG. 3, for instance, an engine may include one, or any combination, of the blocks depicted, so long as at least one block from the HW side is included.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Turning now to the details of the example system, the hardware and software components of a host computer system are operative (e.g., configured, programmed, arranged, etc., to be operational when activated), to implement system 500. System 500 includes SMM transition call originator engine 502. In various embodiments, SMM transition call originator engine 502 is an operative portion of the OS, such as a system or device driver. SMM transition call originator engine 502 initiates the call to transition the CPU to operate in SMM from the normal mode, and passes data, such as operational parameters, etc. to be accessed by the CPU in its SMM operation. Notably, SMM transition call originator engine 502 has a digital signature 504, such as one based on a public-key cryptosystem. Digital signature 504 may be used in conjunction with a digital certificate to prove the identity of SMM transition call originator engine 502.

SMM calling engine 506, according to some embodiments, is a driver, or kernel-level agent implemented as part of the operating system. In the embodiment depicted, SMM calling engine 506 performs certain operations on behalf of SMM transition call originator engine 502 to effect the transition of the CPU from normal mode of operation to SMM. SMM calling engine 506 may include firmware interface engine 508 that is operative to write data to one or more buffers in shared data store 512, that initiate the mode transition. In related embodiments, SMM calling engine 506 includes signing engine 510, which is operative to append digital signature 504 to data being passed to the CPU for SMM operation.

In some embodiments, data store 512 may be implemented as specially-allocated memory space in RAM, NVRAM, disk, or on a remote machine, along with the interconnect(s) and other components suitable for implementing the data store 512.

In an example operation, firmware interface engine 508 writes data to be passed to SMM to data communication buffer 514, and writes to system management interrupt (SMI) control register 516 to trigger the SMI to instantiate the mode transition. In an example, SMI control register has a defined address at 0xB2. In addition, signing engine 510 appends the digital signature of SMM transition call originator engine 502 to the data to be transferred in data communication buffer 514. In a related embodiment, signing engine 510 retrieves, or generates, a digital certificate, and writes the digital certificate to data communication buffer 514.

In a related embodiment, SMM transition call originator engine 502 and SMM calling engine 506 may be implemented as a single construct, as indicated at 505.

The triggering of the SMI activates SMM control engine 518, which is operative to conditionally carry out the mode transition from normal mode to SMM. In the embodiment depicted, SMM control engine 518 includes communication handler engine 520, and SMM code execution engine 522. Communication handler engine 520 responds to the SMI by transitioning the CPU to SMM. However, before communication handler engine 520 allows SMM access to the data stored in data communication buffer 514, communication handler engine 520 calls authorization engine 524 to perform authentication of SMM transition call originator 502 based on the digital signature 504 or digital certificate, according to the various embodiments. In an example, communication handler engine 520 of SMM control engine 518 writes to the digital signature 504, digital certificate, or other proof of identity of SMM transition call originator engine 502 to interface buffer 526 in shared data store 512.

Authorization engine 524 may be implemented at least in part by a caretaker processor according to some embodiments. It includes verification engine 528, and reference database 530. Verification engine 528 accesses the proof of identity, e.g., digital signature 504, digital certificate, etc., stored in engine interface buffer 526, and compares it against reference information in database 530.

Database 530 may include a whitelist and a blacklist of known entities. Identifications of trusted entities may be stored in the whitelist; whereas known bad entities, or known risky entities, such as those whose digital certificates may have expired, or who may have compromised their private key, for example, may be stored in a blacklist. In an embodiment, the contents of database 530 are provisioned at the time of manufacture of the computer system. In a related embodiment, authorization engine 524 has access to an external communication channel, such as a network interface device, and uses the channel to connect with a database update service with such information as new trusted entities, new revocations of signatures/certificates, for example.

In an example, an authentication result may be achieved when the identity in question is confirmed to be in the whitelist and absent from the blacklist. In a related embodiment, database 530 receives periodic updates from a trusted authority via secure external communication channel accessible to authorization engine 524. The result of authentication produces an authorization state for the SMM transition call. This authorization state may be communicated to data communication buffer 514, for example, or by any other suitable channel, so that it may be accessed by communication handler engine 520.

Upon confirmation that the SMM transition call is authorized, communication handler engine 520 permits access to the data in data communication buffer for the CPU running in SMM, and code execution engine 522 is called to read, and operate upon, the data.

In the opposite case, if authentication by verification engine 528 fails, an authorization state indicating the failure may be reported to communication handler engine 520, in which case communication handler engine 520 will prevent the CPU in SMM from accessing the data in data communication buffer 514.

In a related embodiment, authorization engine 524 logs the authentication result, whatever it may be, for future reference.

Figure 6:
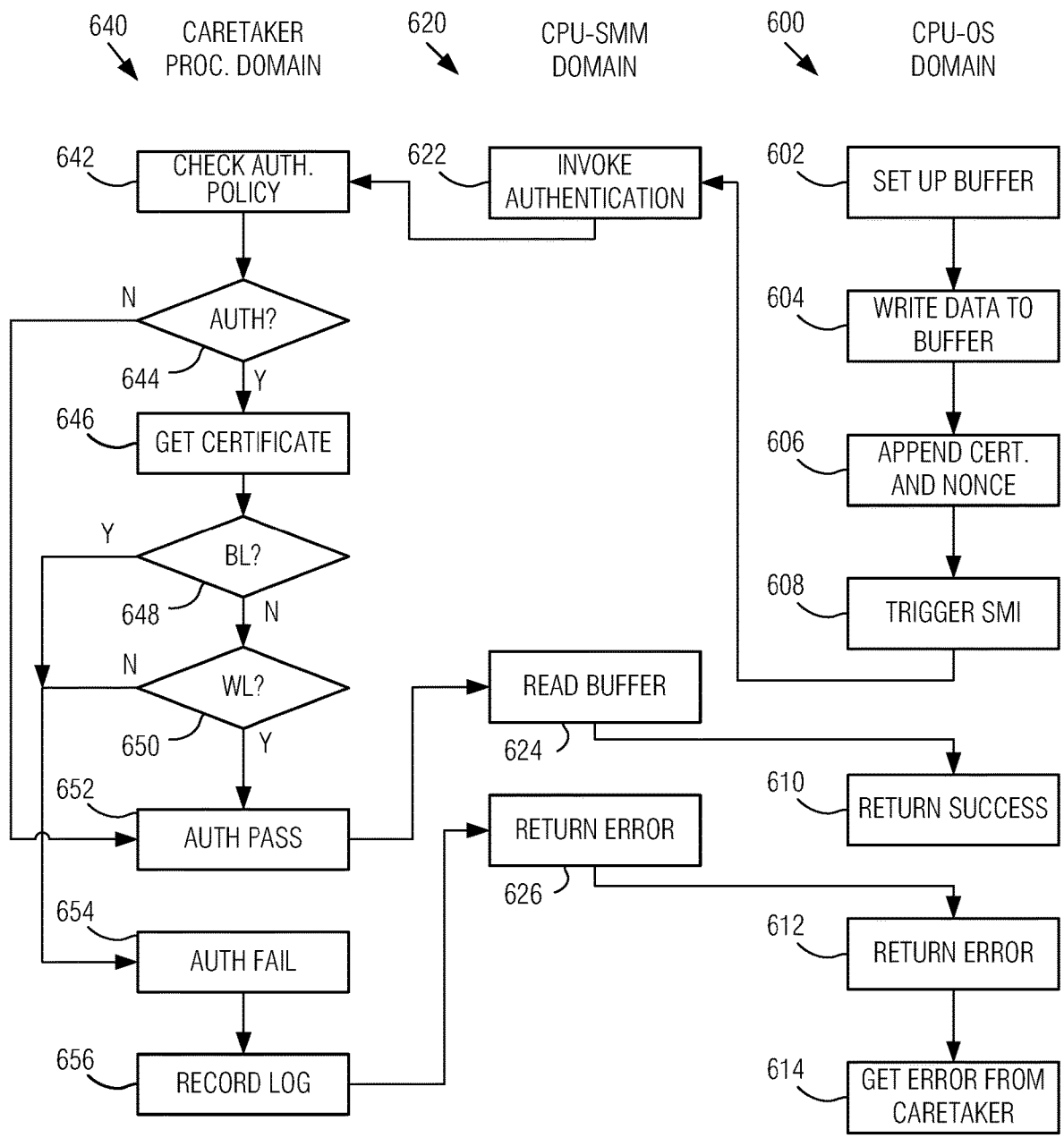
FIG. 6 is a flow diagram illustrating a process of transitioning a CPU mode from normal mode to SMM according to some embodiments.

FIG. 6 is a flow diagram illustrating a process of transitioning a CPU mode from normal mode to SMM according to some embodiments. In some embodiments, the entire process is carried out by a single computer system; in other embodiments, certain operations may be distributed between multiple computer systems using client-server, peer-peer, cloud, or other distributed computing model. As shown in the flow diagram, groups of operations are organized in three columns corresponding to operations carried out by the CPU in the normal mode under the control of the OS (indicated at 600), operations performed by the CPU in the SMM domain (620), and operations by the caretaker processor (640).

At operation 602, the buffer in shared memory space for passing data from the OS domain 600 to the SMM domain 620 is configured. In an embodiment, an OS kernel-level entity, such as a driver process, uses an advanced configuration and power interface (ACPI) of the computer system to allocate a portion of RAM for the data communications buffer. At 604, the OS kernel entity writes data to the established buffer that is meant to be passed to the CPU following transition to SMM. At 606, the OK kernel-level entity appends a digital certificate, digital signature, or some other proof of authenticity, to the data in the buffer. In a related embodiment, as depicted, a unique value, such as a nonce, is also appended to protect against replay events—attacks or errors.

At 608, the SMI is triggered by the kernel-based entity (e.g., writing to address 0xb2), which causes the CPU to transition to SMM.

The process advances to block 622, where the communications handler of the SMM invokes an authentication process that is carried out by caretaker processor domain 640. At 642, the caretaker processor domain checks the authentication policy settings. This operation accommodates an embodiment where there may be a master setting in the caretaker processor domain to either require, or not require, authentication for data passed to SMM. Accordingly, at decision 644, if authentication is not called for, the process advances to 652, where the state is set equivalent to a passing of the authentication. Thus, the SMM domain is notified of the positive authentication (e.g., that the passing of the data to the SMM is authorized), and the SMM is permitted to read the buffer at 624. As a result of the read operation, the process proceeds to 610, where the SMM is transitioned back to normal mode with a successful indication of SMM operation.

Returning to decision 644, if authentication is called for, the process advances to block 646, where the caretaker processor domain 640 reads the digital certificate, digital signature, or other proof of identity, from the buffer. At decisions 648 and 650, the digital certificate, digital signature, or other proof of identity is checked against a blacklist BL and a whitelist WL. As depicted the case where the digital certificate, digital signature, or other proof of identity is absent from the blacklist and present on the whitelist results in a passing authentication result at 652. In any other scenario, the authentication is deemed a failure at 654, which is logged at 656, and reported to the SMM domain at 626, and further to the normal mode at 612. At 614, the OS kernel-level entity may request more details on the failure of authentication from the caretaker processor domain In an example, in response to the details, corrective measures may be taken, such as performing a rootkit scan, updating a driver, etc.

Additional Notes & Examples

Example 1 is a system for securing system management mode (SMM) in a computer system that includes computing hardware (HW), the system comprising: a central processing unit (CPU) of the HW that, when operational, is configurable to execute first code in a normal mode, and second code in a SMM; a SMM control engine implementable at least in part on the HW to transition the CPU from the normal mode to the SMM in response to a SMM transition call, and to control access by the CPU in the SMM to data from an originator of the SMM transition call based on an authorization state assigned to the SMM transition call; and an authorization engine implementable at least in part on the HW to perform authentication of the originator of the SMM transition call in response to the SMM transition call and to assign the authorization state based on an authentication result; wherein the SMM control engine is to prevent the CPU in the SMM from accessing the data in response to the authentication result being a failure of authentication In Example 2, the subject matter of Example 1 optionally includes, wherein the first code includes an operating system (OS), and wherein the second code includes SMM firmware.

In Example 3, the subject matter of any one or more of Examples 1-2 optionally include, wherein the SMM transition call causes generation of a system management interrupt in response to writing of the data in a data communication buffer accessible to the SMM control engine.

In Example 4, the subject matter of any one or more of Examples 1-3 optionally include, wherein the SMM control engine is to invoke the authorization engine to perform the authentication in response to the SMM transition call.

In Example 5, the subject matter of any one or more of Examples 1-4 optionally include, wherein the originator of the SMM transition call is a component of the first code.

In Example 6, the subject matter of any one or more of Examples 1-5 optionally include, wherein the originator of the SMM transition call is a driver engine incorporated into an operating system, wherein the operating system is a portion of the first code.

In Example 7, the subject matter of any one or more of Examples 1-6 optionally include, further comprising: a SMM calling engine implementable at least in part on the HW to access the data from the originator of the SMM transition call and, in response, to effect the transition of the CPU from the normal mode to the SMM.

In Example 8, the subject matter of any one or more of Examples 1-7 optionally include, further comprising: a SMM calling engine implementable at least in part on the HW to access: the data from the originator of the SMM transition call; and a digital signature associated with the originator of the SMM transition call; and wherein the SMM calling engine is further to append the digital signature to the data from the originator and to effect the transition of the CPU from the normal mode to the SMM.

In Example 9, the subject matter of any one or more of Examples 1-8 optionally include, wherein the authorization engine is to perform the authentication based on a validation of a digital certificate of the originator of the SMM transition call.

In Example 10, the subject matter of any one or more of Examples 1-9 optionally include, wherein the authorization engine is to perform the authentication based on a proof of identity of the originator of the SMM transition call.

In Example 11, the subject matter of any one or more of Examples 1-10 optionally include, wherein the authorization engine is to perform the authentication based on a comparison of an identification of the originator of the SMM transition call against a list of trusted identifications.

In Example 12, the subject matter of any one or more of Examples 1-11 optionally include, wherein the authorization engine is implementable on a caretaker processor of the HW that is isolated from the CPU and is to execute dedicated firmware code.

Example 13 is at least one computer-readable medium comprising instructions that, when executed on computing hardware (HW) including a central processing unit (CPU) that is operative in a normal mode and a system management mode (SMM), cause the computing hardware to: execute, by the CPU, first code in a normal mode, and second code in a SMM; transition the CPU from the normal mode to the SMM in response to a SMM transition call, and to control access by the CPU in the SMM to data from an originator of the SMM transition call based on an authorization state assigned to the SMM transition call; perform authentication of the originator of the SMM transition call in response to the SMM transition call and to assign the authorization state based on an authentication result; and prevent the CPU in the SMM from accessing the data in response to the authentication result being a failure of authentication.

In Example 14, the subject matter of Example 13 optionally includes, wherein the first code includes an operating system (OS), and wherein the second code includes SMM firmware.

In Example 15, the subject matter of any one or more of Examples 13-14 optionally include, wherein the SMM transition call causes generation of a system management interrupt in response to writing of the data in a data communication buffer accessible to the SMM control engine.

In Example 16, the subject matter of any one or more of Examples 13-15 optionally include, wherein the originator of the SMM transition call is a component of the first code.

In Example 17, the subject matter of any one or more of Examples 13-16 optionally include, wherein the originator of the SMM transition call is a driver engine incorporated into an operating system, wherein the operating system is a portion of the first code.

In Example 18, the subject matter of any one or more of Examples 13-17 optionally include, wherein the instructions are further to cause the computing hardware to access the data from the originator of the SMM transition call and, in response, to effect the transition of the CPU from the normal mode to the SMM.

In Example 19, the subject matter of any one or more of Examples 13-18 optionally include, wherein the instructions are further to cause the computing hardware to: access the data from the originator of the SMM transition call; access a digital signature associated with the originator of the SMM transition call; and append the digital signature to the data from the originator and to effect the transition of the CPU from the normal mode to the SMM.

In Example 20, the subject matter of any one or more of Examples 13-19 optionally include, wherein the instructions are further to cause the computing hardware to perform the authentication based on a validation of a digital certificate of the originator of the SMM transition call.

In Example 21, the subject matter of any one or more of Examples 13-20 optionally include, wherein the instructions are further to cause the computing hardware to perform the authentication based on a proof of identity of the originator of the SMM transition call.

In Example 22, the subject matter of any one or more of Examples 13-21 optionally include, wherein the instructions are further to cause the computing hardware to perform the authentication based on a comparison of an identification of the originator of the SMM transition call against a list of trusted identifications.

Example 23 is a method for securing system management mode (SMM) in a computer system that includes computing hardware (HW) including a central processing unit (CPU) that is operative in a normal mode and SMM, the method comprising: executing, by the CPU, first code in a normal mode, and second code in a SMM; transitioning the CPU from the normal mode to the SMM in response to a SMM transition call, and controlling access by the CPU in the SMM to data from an originator of the SMM transition call based on an authorization state assigned to the SMM transition call; performing authentication of the originator of the SMM transition call in response to the SMM transition call and assigning the authorization state based on an authentication result; and preventing the CPU in the SMM from accessing the data in response to the authentication result being a failure of authentication In Example 24, the subject matter of Example 23 optionally includes, wherein the first code includes an operating system (OS), and wherein the second code includes SMM firmware.

In Example 25, the subject matter of any one or more of Examples 23-24 optionally include, wherein the SMM transition call causes generation of a system management interrupt in response to writing of the data in a data communication buffer accessible to the SMM control engine.

In Example 26, the subject matter of any one or more of Examples 23-25 optionally include, wherein the originator of the SMM transition call is a component of the first code.

In Example 27, the subject matter of any one or more of Examples 23-26 optionally include, wherein the originator of the SMM transition call is a driver engine incorporated into an operating system, wherein the operating system is a portion of the first code.

In Example 28, the subject matter of any one or more of Examples 23-27 optionally include, further comprising accessing the data from the originator of the SMM transition call and, in response, effecting the transition of the CPU from the normal mode to the SMM.

In Example 29, the subject matter of any one or more of Examples 23-28 optionally include, further comprising: accessing the data from the originator of the SMM transition call; accessing a digital signature associated with the originator of the SMM transition call; and appending the digital signature to the data from the originator and to effect the transition of the CPU from the normal mode to the SMM.

In Example 30, the subject matter of any one or more of Examples 23-29 optionally include, wherein the authentication is based on a validation of a digital certificate of the originator of the SMM transition call.

In Example 31, the subject matter of any one or more of Examples 23-30 optionally include, wherein the authentication is based on a proof of identity of the originator of the SMM transition call.

In Example 32, the subject matter of any one or more of Examples 23-31 optionally include, wherein the authentication is based on a comparison of an identification of the originator of the SMM transition call against a list of trusted identifications.

Example 33 is a system for securing system management mode (SMM) in a computer system that includes computing hardware (HW) including a central processing unit (CPU) that is operative in a normal mode and SMM, the system comprising: means for executing, by the CPU, first code in a normal mode, and second code in a SMM; means for transitioning the CPU from the normal mode to the SMM in response to a SMM transition call, and for controlling access by the CPU in the SMM to data from an originator of the SMM transition call based on an authorization state assigned to the SMM transition call; means performing authentication of the originator of the SMM transition call in response to the SMM transition call and for assigning the authorization state based on an authentication result; and means for preventing the CPU in the SMM from accessing the data in response to the authentication result being a failure of authentication.

In Example 34, the subject matter of Example 33 optionally includes, wherein the first code includes an operating system (OS), and wherein the second code includes SMM firmware.

In Example 35, the subject matter of any one or more of Examples 33-34 optionally include, wherein the SMM transition call causes generation of a system management interrupt in response to writing of the data in a data communication buffer accessible to the SMM control engine.

In Example 36, the subject matter of any one or more of Examples 33-35 optionally include, wherein the originator of the SMM transition call is a component of the first code.

In Example 37, the subject matter of any one or more of Examples 33-36 optionally include, wherein the originator of the SMM transition call is a driver engine incorporated into an operating system, wherein the operating system is a portion of the first code.

In Example 38, the subject matter of any one or more of Examples 33-37 optionally include, further comprising: means for accessing the data from the originator of the SMM transition call and, in response, for effecting the transition of the CPU from the normal mode to the SMM.

In Example 39, the subject matter of any one or more of Examples 33-38 optionally include, further comprising: means for accessing the data from the originator of the SMM transition call; means for accessing a digital signature associated with the originator of the SMM transition call; and means for appending the digital signature to the data from the originator and to effect the transition of the CPU from the normal mode to the SMM.

In Example 40, the subject matter of any one or more of Examples 33-39 optionally include, wherein the authentication is based on a validation of a digital certificate of the originator of the SMM transition call.

In Example 41, the subject matter of any one or more of Examples 33-40 optionally include, wherein the authentication is based on a proof of identity of the originator of the SMM transition call.

In Example 42, the subject matter of any one or more of Examples 33-41 optionally include, wherein the authentication is based on a comparison of an identification of the originator of the SMM transition call against a list of trusted identifications.

In Example 43, the subject matter of any one or more of Examples 33-42 optionally include, wherein the means performing authentication is implementable on a caretaker processor of the HW that is isolated from the CPU and is to execute dedicated firmware code.

Example 44 is at least one computer-readable medium comprising instructions that, when executed on computing hardware (HW) including a central processing unit (CPU) that is operative in a normal mode and a system management mode (SMM), cause the computing hardware to execute the subject matter according to any one of Examples 23-32.

In Example 45 is a system for securing system management mode (SMM) in a computer system that includes computing hardware (HW) including a central processing unit (CPU) that is operative in a normal mode and SMM, the system comprising means for executing the subject matter according to any one of Examples 23-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for securing system management mode (SMM) in a computer system that includes computing hardware (HW), the system comprising:
    a central processing unit (CPU) of the HW that, when operational, is configurable to execute first code in a normal mode, and second code in a SMM;
    a SMM control engine implementable at least in part on the HW to transition the CPU from the normal mode to the SMM in response to a SMM transition call, and to control access by the CPU in the SMM to data from an originator of the SMM transition call based on an authorization state assigned to the SMM transition call; and
    an authorization engine implementable at least in part on the HW to perform authentication of the originator of the SMM transition call in response to the SMM transition call and to assign the authorization state based on an authentication result, wherein the authorization engine is implementable on a caretaker processor of the HW that is isolated from the CPU and is to execute dedicated firmware code;
    wherein the SMM control engine is to prevent the CPU in the SMM from accessing the data in response to the authentication result being a failure of authentication.

2. The system of claim 1, wherein the first code includes an operating system (OS), and wherein the second code includes SMM firmware.

3. The system of claim 1, wherein the SMM transition call causes generation of a system management interrupt in response to writing of the data in a data communication buffer accessible to the SMM control engine.

4. The system of claim 1, wherein the SMM control engine is to invoke the authorization engine to perform the authentication in response to the SMM transition call.

5. The system of claim 1, wherein the originator of the SMM transition call is a component of the first code.

6. The system of claim 1, wherein the originator of the SMM transition call is a driver engine incorporated into an operating system, wherein the operating system is a portion of the first code.

7. The system of claim 1, further comprising:
a SMM calling engine implementable at least in part on the HW to access the data from the originator of the SMM transition call and, in response, to effect the transition of the CPU from the normal mode to the SMM.

8. The system of claim 1, further comprising:
a SMM calling engine implementable at least in part on the HW to access:
the data from the originator of the SMM transition call; and
a digital signature associated with the originator of the SMM transition call; and
wherein the SMM calling engine is further to append the digital signature to the data from the originator and to effect the transition of the CPU from the normal mode to the SMM.

9. The system of claim 1, wherein the authorization engine is to perform the authentication based on a validation of a digital certificate of the originator of the SMM transition call.

10. The system of claim 1, wherein the authorization engine is to perform the authentication based on a proof of identity of the originator of the SMM transition call.

11. The system of claim 1, wherein the authorization engine is to perform the authentication based on a comparison of an identification of the originator of the SMM transition call against a list of trusted identifications.

12. At least one non-transitory computer-readable medium comprising instructions that, when executed on computing hardware (HW) including a central processing unit (CPU) that is operative in a normal mode and a system management mode (SMM), cause the computing hardware to:
execute, by the CPU, first code in a normal mode, and second code in a SMM;
transition the CPU from the normal mode to the SMM in response to a SMM transition call, and to control access by the CPU in the SMM to data from an originator of the SMM transition call based on an authorization state assigned to the SMM transition call;
perform, by an authorization engine, authentication of the originator of the SMM transition call in response to the SMM transition call and to assign the authorization state based on an authentication result, wherein the authorization engine is implementable on a caretaker processor of the HW that is isolated from the CPU and is to execute dedicated firmware code; and
prevent the CPU in the SMM from accessing the data in response to the authentication result being a failure of authentication.

13. The at least one computer-readable medium of claim 12, wherein the first code includes an operating system (OS), and wherein the second code includes SMM firmware.

14. The at least one computer-readable medium of claim 12, wherein the originator of the SMM transition call is a component of the first code.

15. The at least one computer-readable medium of claim 12, wherein the instructions are further to cause the computing hardware to:
access the data from the originator of the SMM transition call;
access a digital signature associated with the originator of the SMM transition call; and
append the digital signature to the data from the originator and to effect the transition of the CPU from the normal mode to the SMM.

16. The at least one computer-readable medium of claim 12, wherein the instructions are further to cause the computing hardware to perform the authentication based on a validation of a digital certificate of the originator of the SMM transition call.

17. The at least one computer-readable medium of claim 12, wherein the instructions are further to cause the computing hardware to perform the authentication based on a proof of identity of the originator of the SMM transition call.

18. The at least one computer-readable medium of claim 12, wherein the instructions are further to cause the computing hardware to perform the authentication based on a comparison of an identification of the originator of the SMM transition call against a list of trusted identifications.

19. A method for securing system management mode (SMM) in a computer system that includes computing hardware (HW) including a central processing unit (CPU) that is operative in a normal mode and SMM, the method comprising:
executing, by the CPU, first code in a normal mode, and second code in a SMM;
transitioning the CPU from the normal mode to the SMM in response to a SMM transition call, and controlling access by the CPU in the SMM to data from an originator of the SMM transition call based on an authorization state assigned to the SMM transition call;
performing, by an authentication engine, authentication of the originator of the SMM transition call in response to the SMM transition call and assigning the authorization state based on an authentication result, wherein the authorization engine is implementable on a caretaker processor of the HW that is isolated from the CPU and is to execute dedicated firmware code; and
preventing the CPU in the SMM from accessing the data in response to the authentication result being a failure of authentication.

20. The method of claim 19, wherein the first code includes an operating system (OS), and wherein the second code includes SMM firmware.

21. The method of claim 19, further comprising:
accessing the data from the originator of the SMM transition call;
accessing a digital signature associated with the originator of the SMM transition call; and
appending the digital signature to the data from the originator and to effect the transition of the CPU from the normal mode to the SMM.

22. The method of claim 19, wherein the authentication is based on a validation of a digital certificate of the originator of the SMM transition call.

23. The method of claim 19, wherein the authentication is based on a proof of identity of the originator of the SMM transition call.

24. The method of claim 19, wherein the authentication is based on a comparison of an identification of the originator of the SMM transition call against a list of trusted identifications.

* * * * *